(12) United States Patent
Vankamamidi et al.

(10) Patent No.: US 11,693,570 B2
(45) Date of Patent: Jul. 4, 2023

(54) MACHINE LEARNING TO IMPROVE CACHING EFFICIENCY IN A STORAGE SYSTEM

(71) Applicant: EMC IP Holding Company LLC, Hopkinton, MA (US)

(72) Inventors: Vamsi Vankamamidi, Hopkinton, MA (US); Shaul Dar, Petach Tikva (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/243,973

(22) Filed: Apr. 29, 2021

(65) Prior Publication Data

US 2022/0350484 A1 Nov. 3, 2022

(51) Int. Cl.
*G06F 3/06* (2006.01)
*G06F 12/0891* (2016.01)

(52) U.S. Cl.
CPC ............ *G06F 3/064* (2013.01); *G06F 3/0604* (2013.01); *G06F 3/0613* (2013.01); *G06F 3/0644* (2013.01); *G06F 3/0679* (2013.01); *G06F 12/0891* (2013.01)

(58) Field of Classification Search
CPC ...... G06F 3/064; G06F 3/0604; G06F 3/0613; G06F 3/0644; G06F 3/0679; G06F 12/0891
See application file for complete search history.

(56) References Cited

U.S. PATENT DOCUMENTS

| | | | | |
|---|---|---|---|---|
| 8,429,346 B1* | 4/2013 | Chen | ..................... | G06F 3/0649 709/215 |
| 9,965,381 B1* | 5/2018 | Sahin | ..................... | G06F 3/0647 |
| 10,146,459 B1* | 12/2018 | Gao | ..................... | G06F 3/0619 |
| 11,586,366 B2* | 2/2023 | Wang | ..................... | G06F 3/0608 |
| 2010/0274983 A1* | 10/2010 | Murphy | ............. | G06F 11/1456 711/170 |

(Continued)

OTHER PUBLICATIONS

Glassborow, Martin. "Automated Storage Tiering Product Comparison." Computerweekly. com, Apr. 25, 2011: 5. (Year: 2011).*

(Continued)

*Primary Examiner* — Francisco A Grullon
(74) *Attorney, Agent, or Firm* — Daly, Crowley, Mofford & Durkee LLP (57) ABSTRACT

A system and method improve caching efficiency in a data storage system by performing machine learning processes on metadata relating to extents of data blocks, rather than individual blocks themselves. Thus, once the storage devices are divided into extents, various metadata regarding access to the blocks within each extent are aggregated, and per-extent features are extracted. These features are used to train a data regression model that is subsequently used to infer a most likely "hotness" value for each extent at a future time. These predicted values, which may be further classified as e.g. "hot", "warm", and "cold" using thresholds, are used to implement the cache replacement policy. Embodiments scale to large and multi-layered caches, and may avoid common caching problems like thrashing, by adjusting the extent size. Policy goal functions may be optimized by dynamically adjusting the classification thresholds.

18 Claims, 9 Drawing Sheets

(56) References Cited

U.S. PATENT DOCUMENTS

| | | | | |
|---|---|---|---|---|
| 2016/0011979 | A1* | 1/2016 | Islam | G06F 3/0619 |
| | | | | 711/102 |
| 2017/0139833 | A1* | 5/2017 | Barajas Gonzalez | |
| | | | | G06F 12/0862 |
| 2019/0243559 | A1* | 8/2019 | Raut | G06F 3/0613 |
| 2019/0324899 | A1* | 10/2019 | Kulkarni | G06F 3/0653 |
| 2020/0034665 | A1* | 1/2020 | Ghanta | G06N 20/00 |
| 2020/0104048 | A1* | 4/2020 | Habbinga | G06F 3/0604 |
| 2020/0302223 | A1* | 9/2020 | Dutta | G06F 16/58 |
| 2020/0302225 | A1* | 9/2020 | Dutta | G06N 3/0445 |
| 2021/0224684 | A1* | 7/2021 | Sarkar | G06F 3/0638 |

OTHER PUBLICATIONS

EMC Corporation (Leveraging Fully Automated Storage Tiering (FAST) with Oracle Database Applications, Sep. 2010) (Year: 2010).*

* cited by examiner

MACHINE LEARNING TO IMPROVE CACHING EFFICIENCY IN A STORAGE SYSTEM

FIELD

The disclosure pertains generally to accessing data within cache memory systems or architectures, and more particularly to replacement of cached data to improve caching efficiency.

BACKGROUND

Figure 1:
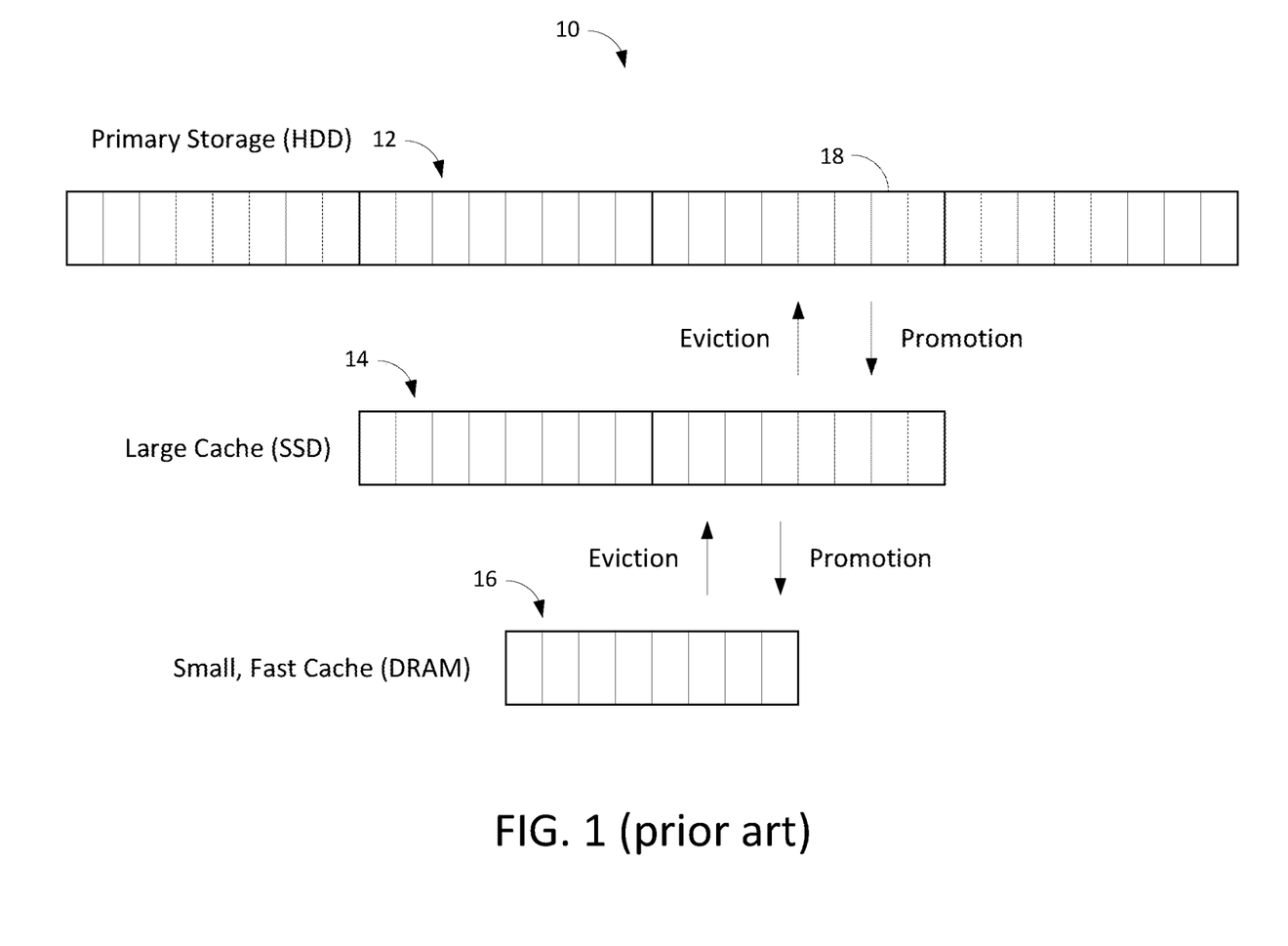
FIG. 1 schematically shows a computer memory system having caching.

FIG. 1 shows a computer memory system 10 known in the art. In such systems, there is an inherent tradeoff between size and speed: larger memories take more time to access. For example, a hard disk drive ("HDD") 12 with spinning data platters used for primary storage may hold around one petabyte of data ($2^{50}$ bytes, or a million gigabytes), but retrieving data from the drive may take on the order of 10 milliseconds. By contrast, a solid state drive ("SSD") 14 may
    store around 100 terabytes, but the access time may be on the order of 100 microseconds. And a volatile memory like a dynamic random access memory ("DRAM") 16 may hold up to 1 terabyte but have an access time of only 100 nanoseconds.

Data caching is a mechanism to accelerate access to certain data by copying ("caching") those data into a memory (a "cache") whose access time is less than the medium from which the data were copied. Modern storage systems make heavy use of caches of different sizes in a layered arrangement. Thus, data needing more frequent or rapid access may be moved ("promoted") from long-term storage on an HDD 12 into a large SSD cache 14 or a small DRAM cache 16, while data needing less frequent or rapid access may be moved in the opposite direction ("evicted") to make room for other data. These memories are organized as containers of fixed size blocks of data, of which block 18 is illustrative, whose size defines the unit of transfer between the different storage levels. A typical block size is 4 kilobytes (KB), but may vary depending on the computer system or the formatting parameters of the storage device. Note also that the size of each layer (i.e. the number of blocks it can store) is orders of magnitude smaller than the next layer down, typically because of cost considerations. In this sense, FIG. 1 is meant only to illustrate the concept of caching; the sizes of the storage devices depicted therein are not to scale.

The main task of each cache is to try to store those blocks that will be accessed in the near future (called a cache "hit") and avoid an expensive access to the next storage level (in the event of a cache "miss"). One metric by which the efficiency of the cache is measured over time is its average hit ratio, which is defined as the accumulative percentage of accesses it was able to serve. Increases in hit ratio, i.e. the ability to predict better which blocks to keep, can have dramatic impact on the average data access latency. Another important metric for caches is the number of "promotions" or data movements into cache. Promoting blocks into a cache may lead to wear, especially for solid state devices, and shorten the useful lifetime of the cache. So, some caches may require balancing an increased hit ratio against a low promotion rate.

To optimize these metrics, a cache employs one or several cache replacement policies to decide which blocks to keep and which blocks to discard. One such policy known in the art is called first-in, first-out ("FIFO"), in accordance with which the cache evicts data that were first placed into the cache, without regard to how often or how many times those data were accessed. Another policy is least-recently-used ("LRU"), which evicts the data that were least recently used by the underlying data consumer, and which is advantageous when new data are more likely to be accessed than old data. By contrast, when data are more often accessed the older they are, the most efficient policy is to evict the most-recently used ("MRU") data. Thus, the optimal cache replacement policy depends on the underlying data access patterns, which may not be known in advance.

Existing cache replacement policies suffer from several limitations. One limitation is that the number of blocks tracked by a cache, using recency and frequency-based mechanisms, is a function of cache size, and this size can be a very tiny percentage of total storage capacity. Another, related limitation is that once a block is replaced, i.e. evicted from a cache, all metadata about that block's access pattern is discarded, so the next time that same block is accessed from higher level storage, the caching policy for that block is not based on prior access history. A further problem is "cache thrashing" that occurs when the working-set of data used by the underlying data consumer is larger than the cache size. In this scenario, the expensive operation of promoting a block into the cache is completed but before there are any hits on that block, that block is replaced with a different block in the working set. This results in low hit ratio and also high promotion rate.

SUMMARY OF DISCLOSED EMBODIMENTS

Disclosed embodiments provide a cache management policy using machine learning that is based on aggregated data access metadata, and is tunable to balance different performance goals such as high hit rate and low promotion rate for very large storage devices. A one petabyte storage comprising 4 KB blocks will have 250 billion blocks. Keeping metadata and performing machine learning with such a large number of items is cost prohibitive. Therefore, rather than tracking individual data blocks, embodiments track storage extents (or simply "extents"), i.e. contiguous areas of storage with a starting address and an ending address, which often exhibit a similar access pattern. For example, files are stored in a storage device using one or more file fragments that each comprise a single extent, so operations that act on files will have similar data access patterns on each extent. A one petabyte storage comprising 32 megabyte (MB) extents will have only 31.25 million items to track, thereby making the problem computationally tractable.

With the scale of the problem reduced so that machine learning techniques are now practical, embodiments train an inference model (and specifically regression models) using machine learning to predict the likelihood that any given extent will be needed in a relevant access time frame (its future "hotness value"), and move data in the cache accordingly. Several advantages exist under this approach. One such advantage is that migrating ranges of blocks rather than individual blocks may lead to better cache efficiency (i.e. a higher hit ratio). Thrashing can be mitigated or avoided by dynamically adapting the size of the extents, e.g. by dynamically merging adjacent extents having similar access patterns, or by dividing extents with address subranges having different access patterns. The data movement policy using extents is entirely complimentary to existing policies that use individual blocks (e.g. multi-priority LRU). Extents may further implicitly identify block access patterns such as sequential, cyclic, or random access. And the metadata created by the prediction algorithm can be used as a basis for prefetch policies, providing an additional performance gain for "cold" blocks. Other advantages may be apparent to a person having ordinary skill in the art.

Thus, a first embodiment is a method of managing blocks of data in a data cache having a first storage device and a second storage device. The method includes organizing the blocks of data in the first storage device into extents, each extent comprising a plurality of the blocks of data having contiguous addresses in the first storage device. The method also includes, for each extent in the first storage device, generating feature data as a function of metadata associated with input/output operations on the blocks of data in the respective extent. The method continues with using a data model trained by machine learning to infer a hotness value for each extent in the first storage device as a function of the generated feature data. The method concludes with promoting blocks of data from the first storage device into the second storage device, and evicting blocks of data stored in the second storage device, according to the inferred hotness values for each extent in the first storage device.

In some embodiments, the metadata associated with input/output operations comprise one or more of: a timestamp, and an input/output command, and a block address, and a data access size, and a data access pattern, and a volume identification.

In some embodiments, the feature data comprise one or more of: a number of blocks within the respective extent that have been accessed more than once during a fixed window of time, and an average number of accesses to such blocks during the fixed window of time, and an average time interval between accesses to such blocks.

Some embodiments include classifying each extent as hot, warm, or cold by applying thresholds to the inferred hotness values, wherein the promoting and evicting of blocks of data are performed according to the classifying.

Some embodiments include dynamically adjusting the thresholds using a feedback loop to maximize one or more goal functions.

Some embodiments include either merging extents having the same classification as hot, warm, or cold according to the thresholds, or dividing an extent into two or more extents, wherein each of the two or more extents has a different classification as hot, warm, or cold according to the thresholds.

In some embodiments, the data cache has a third storage device, the method further comprising performing the above-described organizing, generating, inferring, promoting, and evicting processes with respect to the second and third storage devices. In such embodiments, an extent in the first storage device may be larger than an extent in the second storage device, to reflect the fact that the first storage device as a whole may be larger than the second storage device, which itself may be larger than the third storage device.

Another embodiment is a non-transitory, computer-readable storage medium, in which is stored computer program code for performing the above method, or any of its variations.

Yet another embodiment is a computerized system for managing blocks of data in a data cache having a first storage device and a second storage device. The computerized system includes a metadata generator, coupled to the first and second storage devices, for generating metadata associated with input/output operations on the blocks of data in the data cache. The computerized system also includes a feature generator, coupled to the metadata generator, for generating feature data, as a function of the generated metadata, for each of a plurality of extents in the first storage device, each extent comprising a plurality of the blocks of data in the first storage device having contiguous addresses. The computerized system further includes an inference engine, coupled to the feature generator and comprising a data model, trained by machine learning, for inferring a hotness value for each extent in the first storage device as a function of feature data generated by the feature generator. And the computerized system includes a cache control interface, coupled to the inference engine and the first and second storage devices, for promoting blocks of data from the first storage device into the second storage device, and evicting blocks of data stored in the second storage device, according to the inferred hotness values for each extent in the first storage device.

In some embodiments, the metadata generator is configured to generate metadata comprising one or more of: a timestamp, and an input/output command, and a block address, and a data access size, and a data access pattern, and a volume identification.

In some embodiments, the feature generator is configured to generate feature data comprising one or more of: a number of blocks within the respective extent that have been accessed more than once during a fixed window of time, and an average number of accesses to such blocks during the fixed window of time, and an average time interval between accesses to such blocks.

In some embodiments, the inference engine is further configured for classifying each extent as hot, warm, or cold by applying thresholds to the inferred hotness values, wherein the promoting and evicting of blocks of data are performed according to the classifying.

It is appreciated that the concepts, techniques, and structures disclosed herein may be embodied in other ways, and that the above summary of disclosed embodiments is thus meant to be illustrative rather than comprehensive or limiting.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

Before describing the construction and operation of embodiments according to the concepts, techniques, and structures disclosed herein, shown in FIGS. 2A through 2D are plots of simulated data accesses to different logical block address (LBA) as functions of time to provide background for the understanding of those embodiments. A data access may be, for example, a read instruction, a write instruction, a metadata query, or other input/output ("I/O") function known in the art. In each of these Figures, the horizontal axis represents time in seconds and the vertical axis represents a logical block address; that is, a logical address in memory of a block of data stored in a storage device. As is known in the art, a logical block address is converted to a physical location of the data block according to techniques (such as lookup tables) whose detailed operation is beyond the scope of this disclosure. Each Figure covers 9000 seconds (i.e. 150 minutes or 2.5 hours) of accesses to 10,000 logical blocks. An extent within a Figure represents a vertical range of addresses (e.g. block 0 to block 999, or block 1000 to block 1999, etc.).

Figure 2A:
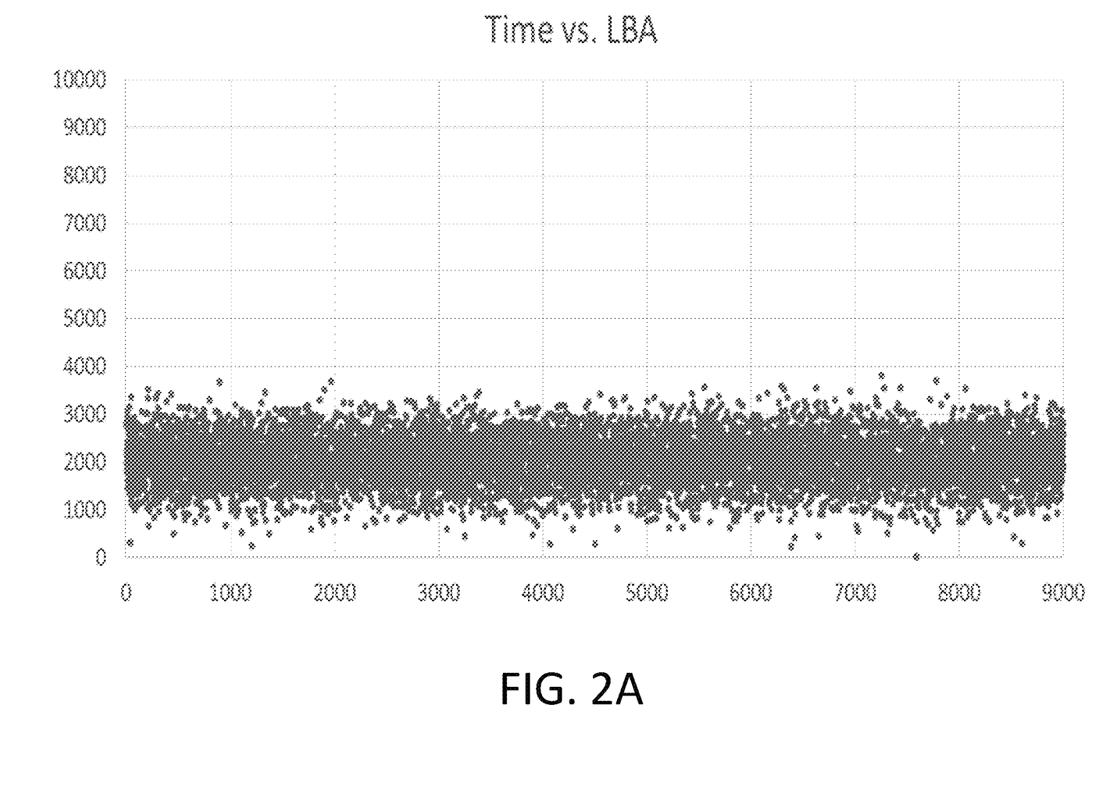
FIGS. 2A through 2D are plots of data accesses to different logical block addresses (LBAs) as functions of time.
Figure 2B:
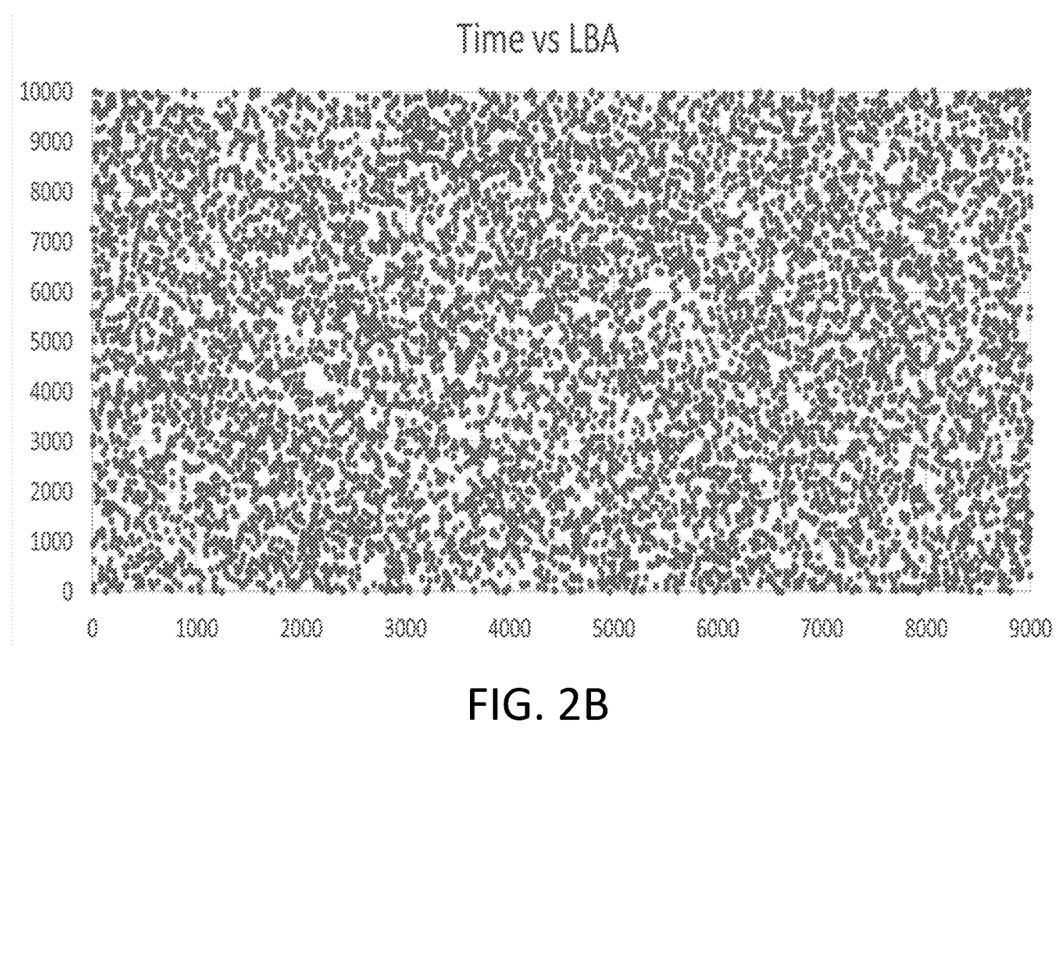
Figure 2C:
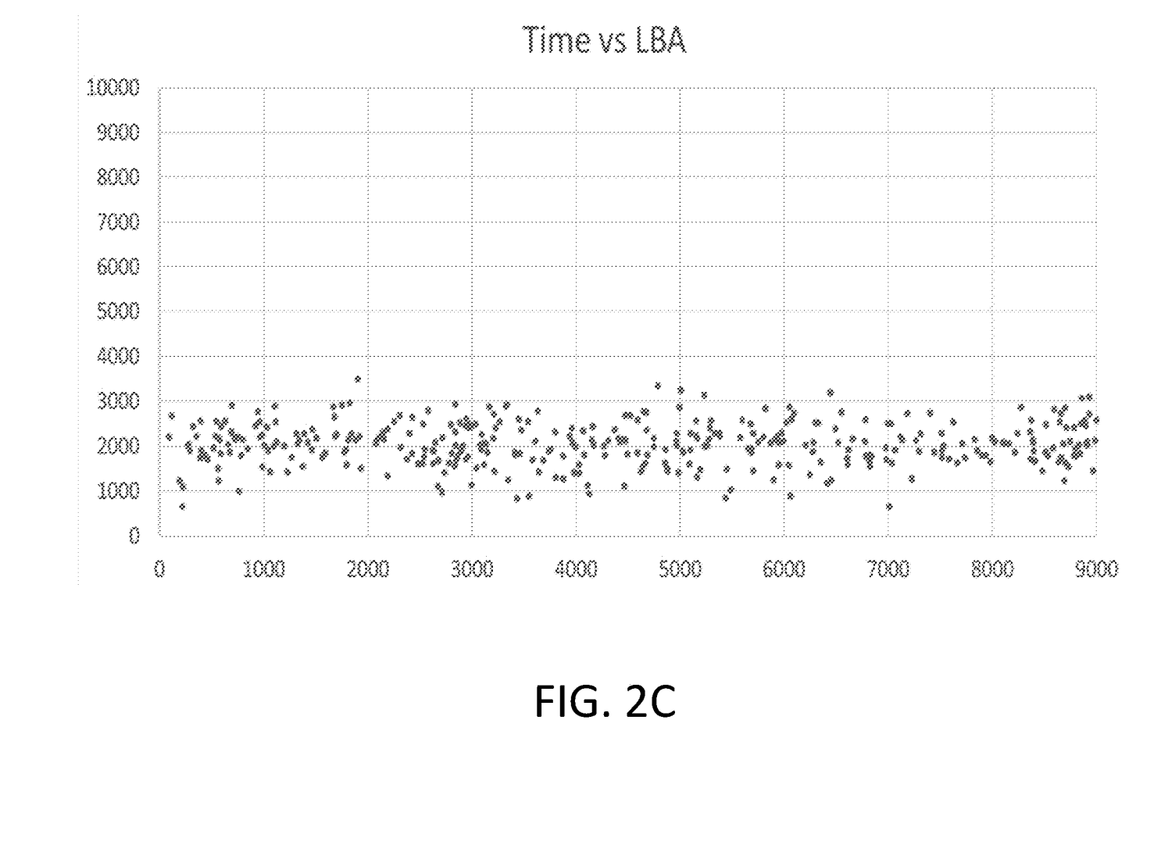
Figure 2D:
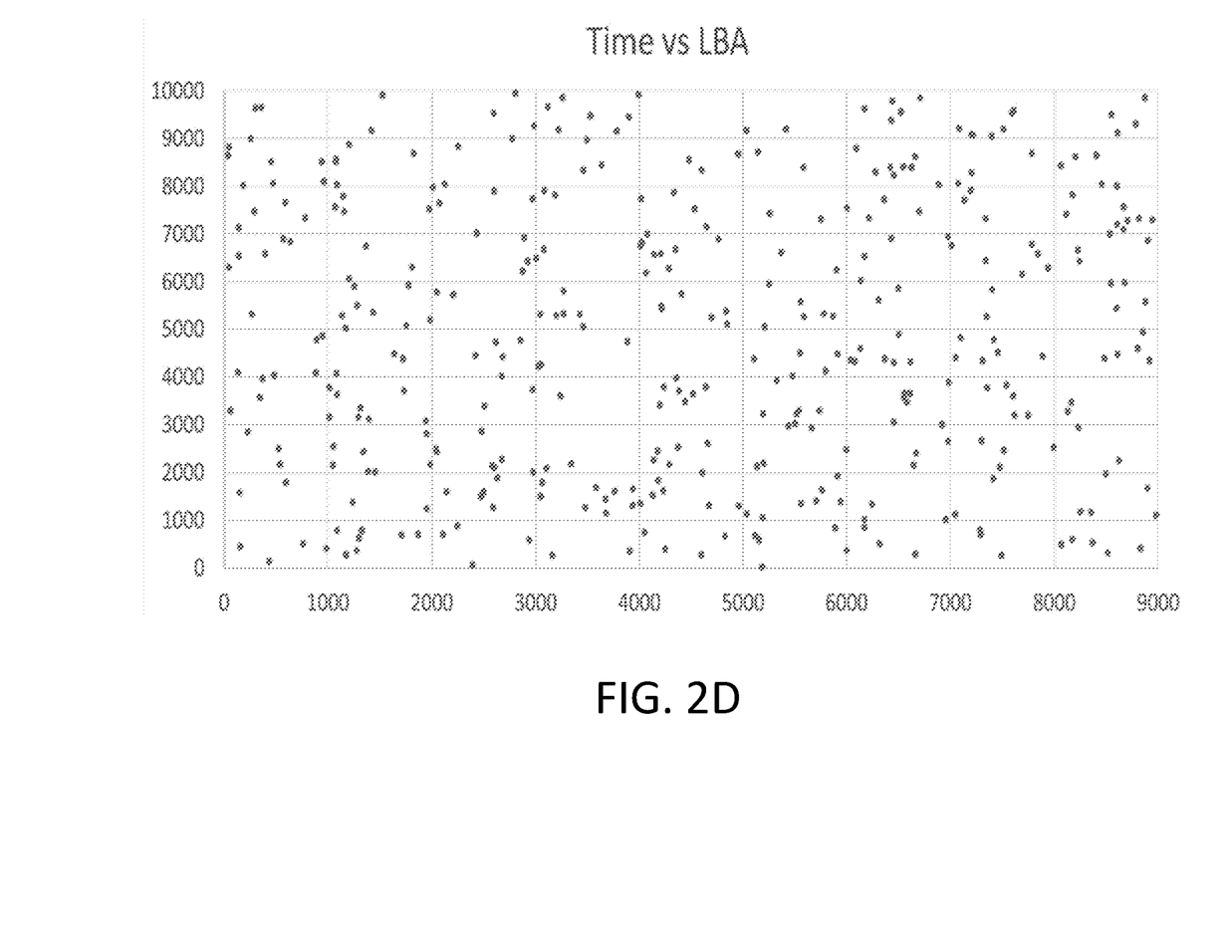

The access metadata shown in FIGS. 2A through 2D may be classified in two ways relevant to the disclosure herein: activity and temperature. Activity represents an indication of how many different addresses are accessed within a given time period, while temperature represents a frequency with which any given address is accessed. Thus, in FIGS. 2A and 2B are shown patterns of data accesses that are considered "active" while in FIGS. 2C and 2D are shown patterns of data accesses that are considered "inactive". Moreover, FIG. 2A shows a pattern of data access that is considered "hot", FIGS. 2B and 2C show patterns of data access that are considered "warm", and FIG. 2D shows a pattern of data access considered "cold".

In more detail, the data accesses shown in FIG. 2A cover all (or nearly all) of the LBAs between 1000 and 3000, representing 20% of the overall address space, and data accesses are nearly constant, so this pattern is both "active" and "hot". The data accesses shown in FIG. 2B cover a large percentage of the overall address space so this pattern is also considered "active". However, the frequency of access at each address is somewhat less than in FIG. 2A (as visibly indicated by "gaps" of horizontal white space between accesses), so this pattern is no longer considered "hot" but merely "warm". The data accesses shown in FIG. 2C also contain moderate delays between accesses at any given LBA so the pattern is still "warm"; however, a much smaller percentage of the address space is accessed (as visibly indicated by "gaps" of vertical white space) so the pattern is considered "inactive". Finally, the data accesses shown in FIG. 2D represent a small percentage of the total address space with substantial delays between repeated accesses, so the pattern is both "inactive" and "cold".

It is appreciated that the classifications of data access patterns as "active" and "inactive", and as "hot", "warm", and "cold" may be based on fixed statistical measures of the address space and frequency of access. It is appreciated, however, that these classifications may be based on dynamic thresholds, as described below in connection with FIG. 4, and that these thresholds may be adjusted to configure the operation of embodiments that move blocks of data in a caching architecture according to such classifications.

Figure 3:
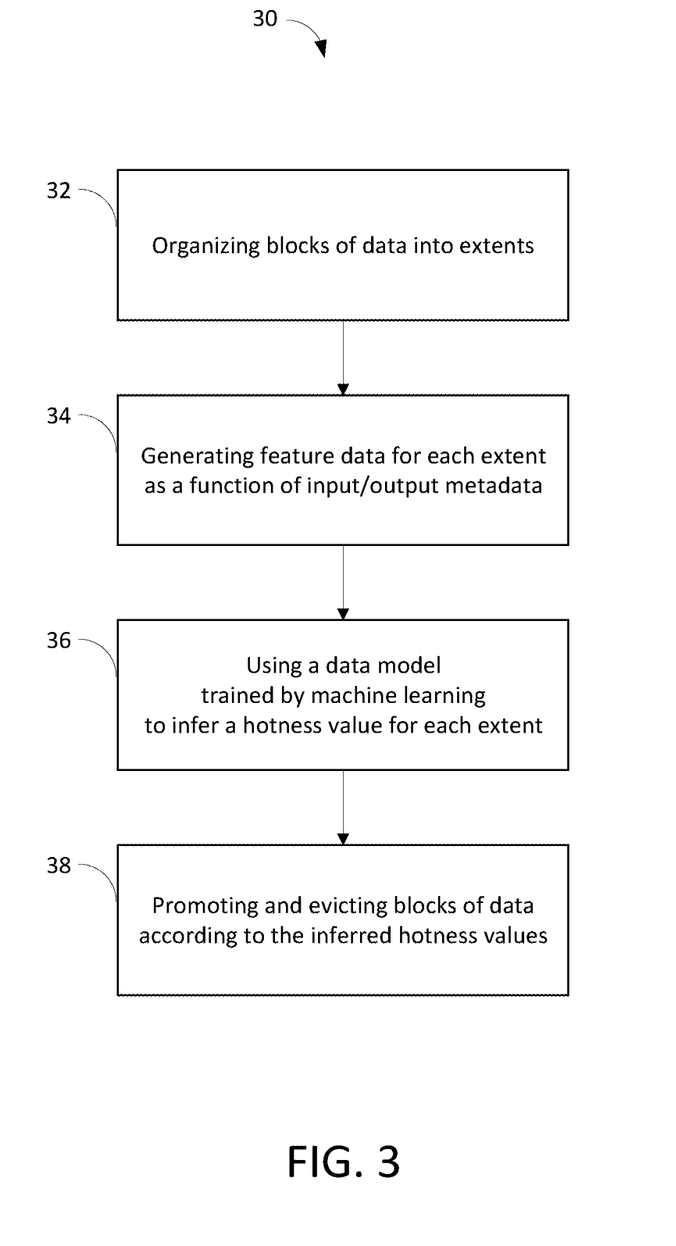
FIG. 3 is a flow diagram of a method according to an embodiment of the concepts, techniques, and structures disclosed herein.

In FIG. 3 is shown a flow diagram of a method 30 of managing blocks of data in a data cache having a first storage device and a second storage device according to an embodiment of the concepts, techniques, and structures disclosed herein. The first storage device represents a larger, slower memory and the second storage device represents a smaller, faster memory that acts to cache data for the first storage device. As summarized above, the method 30 operates as a function of statistical metadata relating to extents, rather than individual blocks, thus making machine learning techniques feasible and advantageous. In general, metadata regarding data access to the blocks of each extent are gathered, then used as inputs to a data model trained on such data to forecast a "gain" or "hotness value". This is a heuristic value of each extent to be promoted into the cache (i.e. moved from the first storage device to the second), or evicted from the cache (i.e. deleted from the second storage device to make room for "hotter" data). These processes are now described in more detail.

The method 30 begins with a process 32 organizing the blocks of data in the first storage device into extents. Each extent is a collection of blocks having contiguous addresses, as known in the art. However, the organization of data into extents in accordance with embodiments need not be done in a uniform matter. Illustratively, a cloud storage vendor may provide the storage devices used in an embodiment, and create and lease out volumes of storage of varying sizes to different customers. Each customer may store and access data differently, and thus may be given the ability to configure caching with extent sizes optimized for its own data access patterns and needs.

The method 30 continues with a process 34 generating feature data for each extent as a function of metadata associated with input/output operations on the blocks of data in the respective extent. The metadata may include, for example: a timestamp of a data access, and an input/output command (e.g. READ, or WRITE, or UNMAP, etc.), and a logical block address, and a data access size, and a data access pattern (e.g. sequential access, or random access, or "caterpillar" alternating access, or an I/O stride), and a volume identification. These metadata, and their methods of capture, are known in the art, and it is appreciated that a person having ordinary skill in the art will recognize other metadata associated with I/O operations that may be collected, and how to collect them.

During this process 34, all the metadata collected for each extent are analyzed to generate features for machine learning. Since duration of time for the captured stats can vary, all the generated features may be normalized for time (e.g. 1 hour). Also, since it is not feasible to track and maintain features on a per-block basis, these metadata may be averaged and maintained on a per-extent basis.

Some of the features generated per extent are now described. One such feature is a "re-access block count", which is a number of blocks within the respective extent that have been accessed more than once during a fixed window of time. This feature indicates whether blocks in this extent should be cached, as blocks that are accessed only once have a lower hit ratio than blocks that are re-accessed. Another feature is "re-access count", which is an average number of times blocks in the extent have been re-accessed within the given interval. This feature indicates whether frequency-based caching policies should be applied on this extent. Yet another feature is "average time gap", which is an average time interval between re-accesses to blocks within the extent. This feature indicates how great an impact various eviction policies (e.g. LRU or similar policy) would have on hit ratio. The latter statistic may be normalized based on I/O-activity on the system (i.e. busy vs. idle system). It is appreciated that other features may be generated for each extent, and that doing so may increase the effectiveness of the machine learning processes described below. A machine learning "sub-model" may also be applied to calculate features for the regression model described below. For example, a classification model may be trained to infer the access pattern for each extent (e.g. sequential, cyclic, stepped, or random).

The method 30 continues with a process 36 using a data model trained by machine learning to infer a hotness value for each extent in the first storage device as a function of the generated feature data. That is, the data model encodes a function that maps input feature data to output hotness values for an extent. The goal of the machine learning model is thus to quantify the hotness of each extent, which is correlated with the performance gain if caching is applied to blocks in that extent. Heuristically, hotter extents should be prioritized for caching over colder extents.

Before the model may be used to infer a hotness value, it must be trained using relevant data. The training dataset may be generated as follows. First, different application workloads are run. Second, metadata are captured and per-extent features are generated, as described above in connection with process 34. Third, a "gain" value is assigned to extents having I/O activity whose blocks are cached. The gain value is a heuristic measure of the value of the extent as relates to caching; extents with higher gain values should be prioritized for caching over those with lower gain values, and are viewed as "hotter". These concepts are discussed further below in connection with FIG. 4.

It is appreciated that data may be collected from a variety of application sources. Workloads may be run on many different appliances (e.g. computer servers) having varying hardware and/or software specifications, and the data may then be averaged to produce a model that works sufficiently well across all appliances. Alternately, workloads may be run on particular appliances with specialized configurations, to train a model that works very well on that set up. Or, workloads may be collected from an appliance average to produce an initial model that is supplemented with data from a local appliance to form a hybrid training mode. A person having ordinary skill in the art my recognize other manners of assembling an appropriate data set for training the hotness prediction model.

Different regression algorithms may be used during training. Ensemble methods, such as random forest using a collection of decision trees, are good candidates because of their simplicity, speed, and lower risk of overfitting. The training process can be scaled by running it in parallel on multiple cores and may also be distributed to multiple nodes. If additional precision is desired, deep learning models may be used, with the graphics processing units (GPUs) optionally used to accelerate the training process.

Model training can be performed as an offline process. Alternately, online learning algorithms may be used, where the model is changed as new metadata comes in, e.g. via sampling data accesses at regular intervals. The training process can be adjusted to acquire more useful data during active learning. For example, extents may be sampled with higher frequency if the quality of their current model (as measured by mean squared error, root mean squared error, or similar metrics) is low.

To minimize memory and CPU requirements for online learning, statistics may be aggregated periodically according to regular samples. Aggregation may be performed using a dual tablet system. Such a system uses a "tick-tock" model, in which one tablet is always active and aggregates new data, while the other table is frozen and its data are used for analysis and model training. After a given interval (e.g. 1 hour) or when the active tablet is full, the two tablets swap roles.

Some access patterns may exhibit time related characteristics. For example, some applications may run only at particular times (e.g. at night, on the weekend, or on the $1^{st}$ day of every month). Time-series analysis may be advantageously applied in such situations to help adapt to seasonality or periodicity in the access patterns of different extents in the system, and thus optimize caching policies accordingly.

The method 30 concludes with a process 38 promoting blocks of data from the first storage device into the second storage device, and evicting blocks of data stored in the second storage device, according to the inferred hotness values for each extent in the first storage device. That is, when the process 36 indicates that a particular un-cached extent has become hot enough to cache, the process 38 initiates the relevant functions to make space in the cache (i.e. the second storage device) using whatever cache replacement policy happens to be in effect, then caches the extent from the first storage device.

The process 38 may determine that an extent has become hot enough to cache on the basis of the inferred hotness values. In particular, the cache replacement policy may be a function of either raw hotness values, or of a further classification of those values into discrete classes, e.g. "hot", "warm", and "cold" or the like, using hotness thresholds. In particular, the promoting and evicting of blocks of data may be performed according to such classifying.

Figure 4:
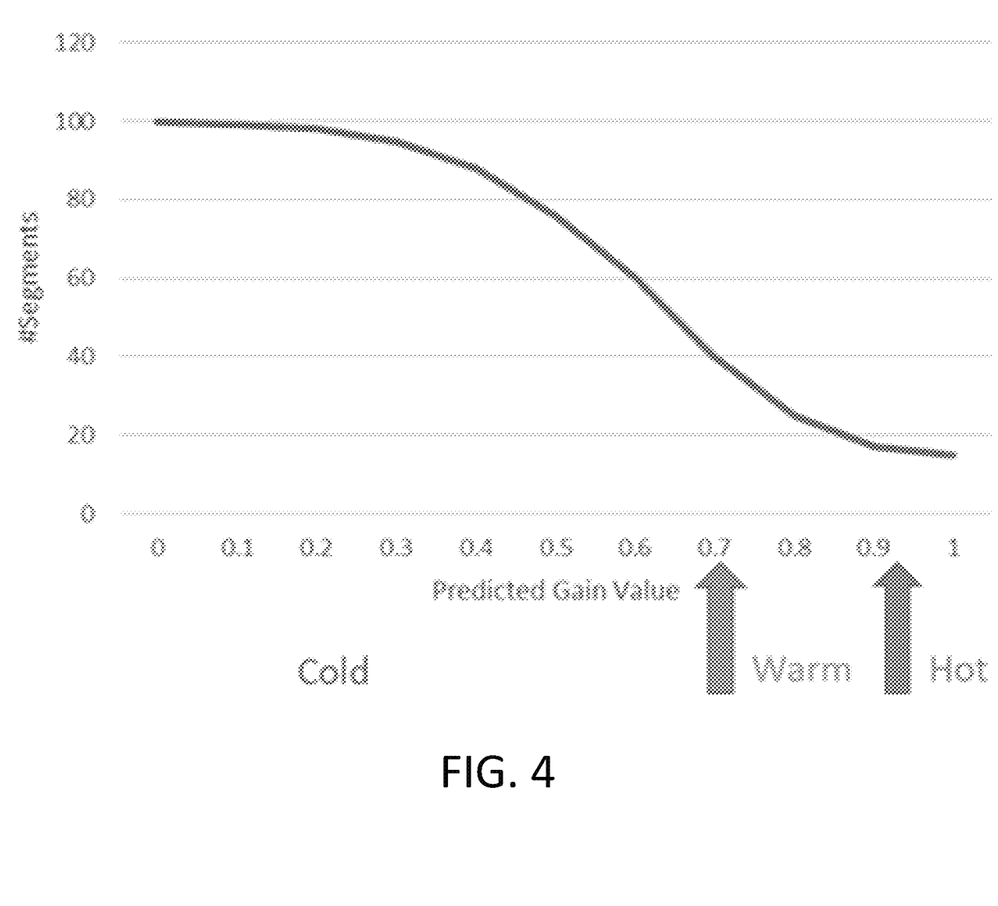
FIG. 4 shows the use of thresholds to classify extents at hot, warm, or cold.

In FIG. 4 is shown the use of thresholds to classify extents at hot, warm, or cold based on predicted hotness or "gain" values. Illustratively, the gain values are shown on the horizontal axis as normalized and having values between 0.0 and 1.0. The vertical axis represents the number of segments or extents having the predicted gain value. As may be appreciated from this Figure, a typical storage system may have a large number of cold extents and a small number of hot extents, with the relationship being usually monotonic.

FIG. 4 shows three classifications of extents as hot, warm, or cold. While these three terms are used for simplicity and ease of understanding, it is understood that other classifications of extents are possible for use in accordance with embodiments. Thus, for example, extents may be classified as simply hot or cold, or additional classes of extents may be added to provide even finer granularity to cache replacement policies.

In connection with cache replacement policies using the terms herein, hot extents may be designated for caching always, warm extents may be designated as available for caching if other goals (e.g. minimizing promotion rates or cache thrashing) are met, and cold extents may be designated as not immediately cacheable. It is appreciated that a cache replacement policy in accordance with embodiments may designate other roles for hot, warm, and cold extents, or for other classifications of extent gain values as described above.

As shown in FIG. 4, predicted gain values below a threshold of about 0.7 are classified as cold, predicted gain values between about 0.7 and about 0.92 are classified as warm, and predicted gain values above a threshold of about 0.92 are classified as hot. These values are merely exemplary, and it should be understood that embodiments may use other thresholds to classify extents as hot, warm, or cold. As noted, in some embodiments these thresholds are fixed, but in other embodiments these thresholds are dynamically adjustable, e.g. using a feedback loop to maximize one or more goal functions. Goal functions may include, without limitation: maximizing the cache hit ratio (or equivalently, minimizing the cache miss ratio); minimizing promotion rates; minimizing thrashing; and ensuring that all hot extents are present in the cache given the size of the cache. A person having ordinary skill in the art may recognize other goals that might be devised to improve caching performance, and how to compute goal functions to maximize or minimize for this purpose. Thus, dynamic adjustment of thresholds automatically adapts to different working-set and cache sizes.

Moreover, caching policies themselves may be augmented by the classification of extents as hot, warm, and cold. For example, one might implement a buffer cache that has promotion-on-first-access policy. Thus, blocks accessed from hot extents can be directly promoted into a high-retention queue, blocks from warm extents can be promoted into a medium-retention queue, and blocks from cold extents can be promoted into a low-retention queue. This type of caching helps to solve the problem of cache thrashing with policies known in the prior art, in which all blocks are first promoted to a low-retention queue, but hot blocks in the low-retention queue are evicted even before they are re-accessed and get a chance to be promoted into to medium priority queue.

Rather than using hotness for direct placement, an alternative cache replacement policy minimizes promotion cost into level 2 (L2) caches by using re-access count. The policy could be applied such that blocks from hot extents can be promoted on first-access, blocks from warm extents require a second access to be promoted, and blocks from cold extents require a third access before being promoted into the L2 cache. This type of policy helps minimize the number of promotions into the cache, and thus minimizes SSD wear.

Regardless of the caching policy, efficiency may be improved by minimizing the number of extents needed to track, while nevertheless ensuring that address ranges having different access patterns are tracked in different extents. This goal can be accomplished by merging adjacent extents having the same classification as hot, warm, or cold according to the thresholds, and dividing extents into two or more extents so that each of the two or more extents has a different classification as hot, warm, or cold according to the thresholds. Both processes are relatively simple to implement because extents are defined by two numbers: a beginning address and an ending address.

To be explicit, suppose one extent has a beginning address of B1 and an ending address of E1, while an adjacent extent has a beginning address of B2 and an ending address of E2, and both extents have the same access pattern and should be merged. Because the extents are adjacent, the merged extent has a beginning address of B1 and an ending address of E2—it is only necessary to "forget" E1 and B2 to perform the merge. Similarly, to divide an extent beginning at address B1 and ending at address E1, it is only necessary to identify "splitting" addresses E and B (e.g. using a sub-extent block analysis) so that the first extent begins at B1 and ends at E and the second extent begins at B and ends at E1. Because the new extents are adjacent, the address B is exactly one greater than the address E, i.e. B=E+1.

The techniques described above in connection with FIGS. 3 and 4 may be applied to caches having multiple levels. Consider a three level caching system having a large hard disk drive (HDD), a medium-sized solid state drive (SSD) level 2 cache, and a small dynamic random access memory (DRAM) level 1 cache. Data blocks may be cached from the HDD to the SSD according to one implementation of these methods, and data blocks may be cached from the SSD to the DRAM according to a second implementation. Both implementations may use the same hardware and/or software, or different means for each implementation. In either event, however, it is appreciated that the implementations may use separate data models and separate parameters (e.g. extent sizes, caching thresholds, and so on). Thus, for example, an extent in the first storage device (the HDD, for data to be cached in the SSD) may be larger in size than an extent in the second storage device (the SSD, for data to be cached in the DRAM). This distinction may hold for every feature of the model, and for the hotness values that the model produces. This type of separation allows the models and parameters to be even further optimized.

Figure 5:
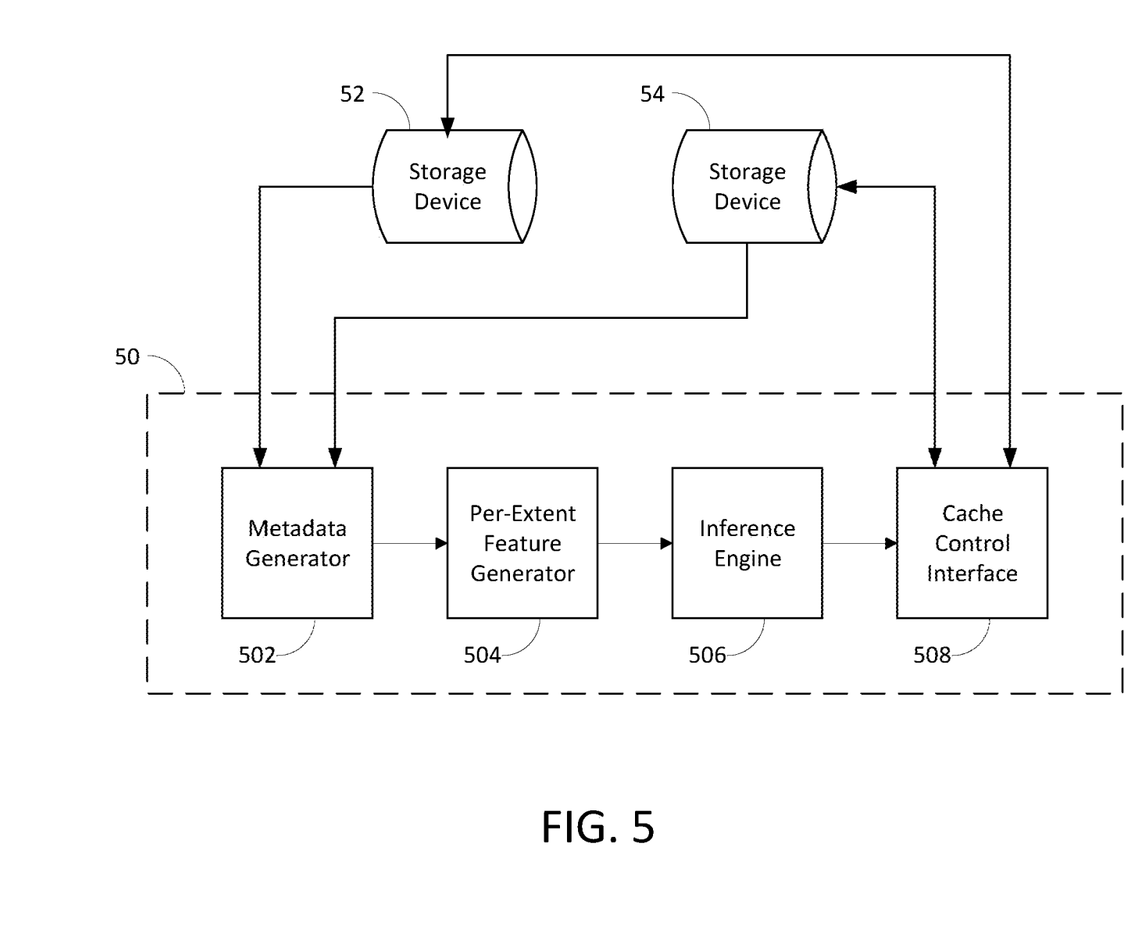
FIG. 5 schematically shows relevant parts of a computerized system embodiment.

FIG. 5 schematically shows relevant parts of a computerized system 50 that embodies the concepts, techniques, and structures disclosed herein. In particular, the system 50 may be used to implement, in whole or in part, the method 30 of FIG. 3 or the dynamic thresholding described in connection with FIG. 4. The system 50 is coupled to a first storage device 52 and a second storage device 54, and manages blocks of data stored therein according to a caching arrangement.

The system 50 includes a metadata generator 502 for generating metadata associated with input/output operations on the blocks of data in the data cache. The metadata generator 502 may be configured to perform a first portion of the process 34 of FIG. 3. The metadata may be, as described in connection with that Figure, one or more of: a timestamp, and an input/output command, and a block address, and a data access size, and a data access pattern, and a volume identification, or other, similar information regarding data access to the first storage device 52 and the second storage device 54. These metadata may be collected directly from the storage devices 52, 54, or may be statistical functions of raw metadata so collected.

The system 50 also includes a per-extent feature generator 504 for generating feature data, as a function of the generated metadata, for each of a plurality of extents. The per-extent feature generator 504 may be configured to perform a second portion of the process 34 of FIG. 3. The per-extent feature generator 504 takes the metadata and extracts or computes various features, such as a number of blocks within the respective extent that have been accessed more than once during a fixed window of time (a re-access block count), and an average number of accesses to such blocks during the fixed window of time (a re-access count), and an average time interval between accesses to such blocks (an average time gap).

The system 50 further includes an inference engine 506 comprising a data model, trained by machine learning, for inferring a hotness value for each extent as a function of feature data generated by the feature generator. The inference engine 506 may be configured to perform the process 36 of FIG. 3. Thus, the inference engine 506 may be trained using relevant data, collected from a variety of application sources, to fit a regression to the training data and thereby compute a function from input features to predicted hotness values. The training may be performed offline or online, and online training may use implemented using a dual tablet system. Time-series analysis also may be performed. The inference engine 506 also may be configured for classifying each extent as hot, warm, or cold by applying thresholds to the inferred hotness values, and these thresholds may be dynamically modified as described above in connection with FIG. 4.

The system 50 finally has a cache control interface 508 for promoting blocks of data from the first storage device 52 into the second storage device 54, and evicting blocks of data stored in the second storage device 54, according to the inferred hotness values. Existing cache policies may be utilized by the cache control interface 508, which may communicate directly with the storage devices 52, 54 or may use an application programming interface (API), not shown, to implement these policies. The cache control interface 508 may perform the promoting and evicting processes according to the classifying into hot, warm, and cold extents, if that was done by the inference engine 506.

Figure 6:
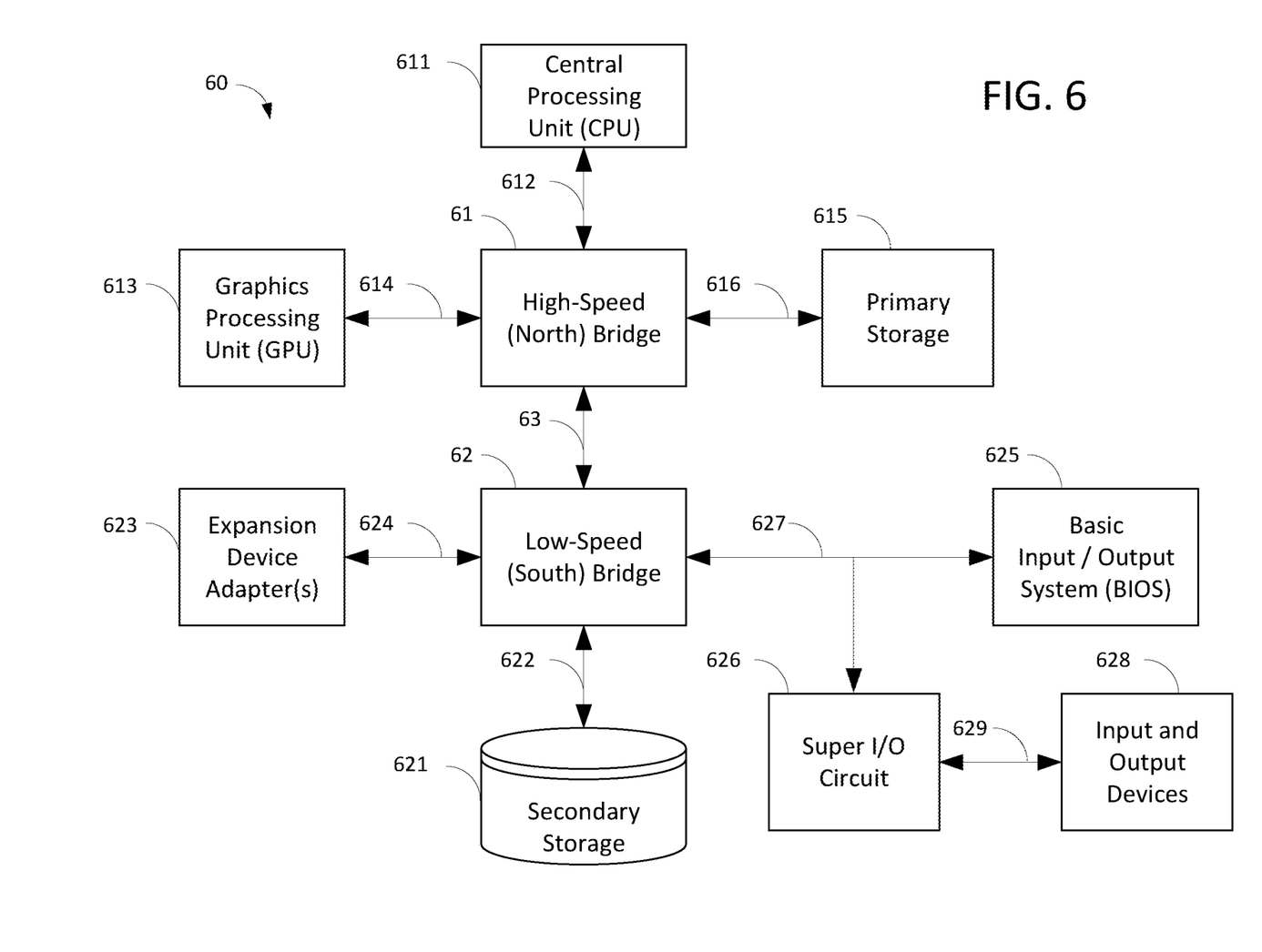
FIG. 6 schematically shows relevant physical components of a computer that may be used to embody the concepts, structures, and techniques disclosed herein.

FIG. 6 schematically shows relevant physical components of a computer 60 that may be used to embody the concepts, structures, and techniques disclosed herein. In particular, the computer 60 may be used to implement, in whole or in part, the method 30 of FIG. 3, or the computerized system 50 of FIG. 5. Generally, the computer 60 has functional components that communicate data with each other using data buses. The functional components of FIG. 6 are physically arranged based on the speed at which each must operate, and the technology used to communicate data using buses at the necessary speeds to permit such operation.

Thus, the computer 60 is arranged as high-speed components and buses 611 to 616 and low-speed components and buses 621 to 629. The high-speed components and buses 611 to 616 are coupled for data communication using a high-speed bridge 61, also called a "northbridge," while the low-speed components and buses 621 to 629 are coupled using a low-speed bridge 62, also called a "southbridge."

The computer 60 includes a central processing unit ("CPU") 611 coupled to the high-speed bridge 61 via a bus 612. The CPU 611 is electronic circuitry that carries out the instructions of a computer program. As is known in the art, the CPU 611 may be implemented as a microprocessor; that is, as an integrated circuit ("IC"; also called a "chip" or "microchip"). In some embodiments, the CPU 611 may be implemented as a microcontroller for embedded applications, or according to other embodiments known in the art.

The bus 612 may be implemented using any technology known in the art for interconnection of CPUs (or more particularly, of microprocessors). For example, the bus 612 may be implemented using the HyperTransport architecture developed initially by AMD, the Intel QuickPath Interconnect ("QPI"), or a similar technology. In some embodiments, the functions of the high-speed bridge 61 may be implemented in whole or in part by the CPU 611, obviating the need for the bus 612.

The computer 60 includes one or more graphics processing units (GPUs) 613 coupled to the high-speed bridge 61 via a graphics bus 614. Each GPU 613 is designed to process commands from the CPU 611 into image data for display on a display screen (not shown). In some embodiments, the CPU 611 performs graphics processing directly, obviating the need for a separate GPU 613 and graphics bus 614. In other embodiments, a GPU 613 is physically embodied as an integrated circuit separate from the CPU 611 and may be physically detachable from the computer 60 if embodied on an expansion card, such as a video card. The GPU 613 may store image data (or other data, if the GPU 613 is used as an auxiliary computing processor) in a graphics buffer.

The graphics bus 614 may be implemented using any technology known in the art for data communication between a CPU and a GPU. For example, the graphics bus 614 may be implemented using the Peripheral Component Interconnect Express ("PCI Express" or "PCIe") standard, or a similar technology.

The computer 60 includes a primary storage 615 coupled to the high-speed bridge 61 via a memory bus 616. The primary storage 615, which may be called "main memory" or simply "memory" herein, includes computer program instructions, data, or both, for use by the CPU 611. The primary storage 615 may include random-access memory ("RAM"). RAM is "volatile" if its data are lost when power is removed, and "non-volatile" if its data are retained without applied power. Typically, volatile RAM is used when the computer 60 is "awake" and executing a program, and when the computer 60 is temporarily "asleep", while non-volatile RAM ("NVRAM") is used when the computer 60 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 616 may be implemented using any technology known in the art for data communication between a CPU and a primary storage. The memory bus 616 may comprise an address bus for electrically indicating a storage address, and a data bus for transmitting program instructions and data to, and receiving them from, the primary storage 615. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 60 may use up to $8*2^{32}=32$ gigabytes (GB) of primary storage 615. In this example, the memory bus 616 will have a total width of 64+32=96 bits. The computer 60 also may include a memory controller circuit (not shown) that converts electrical signals received from the memory bus 616 to electrical signals expected by physical pins in the primary storage 615, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 611, the graphics processing units 613, the primary storage 615, and the high-speed bridge 61, or any combination thereof, as a single integrated circuit. In such embodiments, buses 612, 614, 616 may form part of the same integrated circuit and need not be physically separate. Other designs for the computer 60 may embody the functions of the CPU 611, graphics processing units 613, and the primary storage 615 in different configurations, obviating the need for one or more of the buses 612, 614, 616.

The depiction of the high-speed bridge 61 coupled to the CPU 611, GPU 613, and primary storage 615 is merely exemplary, as other components may be coupled for communication with the high-speed bridge 61. For example, a network interface controller ("NIC" or "network adapter") may be coupled to the high-speed bridge 61, for transmitting and receiving data using a data channel. The NIC may store data to be transmitted to, and received from, the data channel in a network data buffer.

The high-speed bridge 61 is coupled for data communication with the low-speed bridge 62 using an internal data bus 63. Control circuitry (not shown) may be required for transmitting and receiving data at different speeds. The internal data bus 63 may be implemented using the Intel Direct Media Interface ("DMI") or a similar technology.

The computer 60 includes a secondary storage 621 coupled to the low-speed bridge 62 via a storage bus 622. The secondary storage 621, which may be called "auxiliary memory", "auxiliary storage", or "external memory" herein, stores program instructions and data for access at relatively low speeds and over relatively long durations. Since such durations may include removal of power from the computer 60, the secondary storage 621 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 622 may be implemented using any technology known in the art for data communication between a CPU and a secondary storage and may include a host adaptor (not shown) for adapting electrical signals from the low-speed bridge 62 to a format expected by physical pins on the secondary storage 621, and vice versa. For example, the storage bus 622 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 60 also includes one or more expansion device adapters 623 coupled to the low-speed bridge 62 via a respective one or more expansion buses 624. Each expansion device adapter 623 permits the computer 60 to communicate with expansion devices (not shown) that provide additional functionality. Such additional functionality may be provided on a separate, removable expansion card, for example an additional graphics card, network card, host adaptor, or specialized processing card.

Each expansion bus 624 may be implemented using any technology known in the art for data communication between a CPU and an expansion device adapter. For example, the expansion bus 624 may transmit and receive electrical signals using a Peripheral Component Interconnect ("PCI") standard, a data networking standard such as an Ethernet standard, or a similar technology.

The computer 60 includes a basic input/output system ("BIOS") 625 and a Super I/O circuit 626 coupled to the low-speed bridge 62 via a bus 627. The BIOS 625 is a non-volatile memory used to initialize the hardware of the computer 60 during the power-on process. The Super I/O circuit 626 is an integrated circuit that combines input and output ("I/O") interfaces for low-speed input and output devices 628, such as a serial mouse and a keyboard. In some embodiments, BIOS functionality is incorporated in the Super I/O circuit 626 directly, obviating the need for a separate BIOS 625.

The bus 627 may be implemented using any technology known in the art for data communication between a CPU, a BIOS (if present), and a Super I/O circuit. For example, the bus 627 may be implemented using a Low Pin Count ("LPC") bus, an Industry Standard Architecture ("ISA") bus, or similar technology. The Super I/O circuit 626 is coupled to the I/O devices 628 via one or more buses 629. The buses 629 may be serial buses, parallel buses, other buses known in the art, or a combination of these, depending on the type of I/O devices 628 coupled to the computer 60.

The techniques and structures described herein may be implemented in any of a variety of different forms. For example, features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of managing blocks of data in a data cache having a first storage device and a second storage device, wherein each block of data has a fixed size that defines the unit of transfer between the first storage device and the second storage device, the method comprising:
   organizing the blocks of data in the first storage device into a plurality of extents, each extent comprising a plurality of the blocks of data having contiguous addresses, in the first storage device, wherein at least two extents in the first storage device have different sizes;
   for each extent in the first storage device, generating feature data as a function of metadata associated with input/output operations on the blocks of data in the respective extent;
   using a data model trained by machine learning to infer a hotness value for each extent in the first storage device as a function of the generated feature data; and
   promoting blocks of data from the first storage device into the second storage device, and evicting blocks of data stored in the second storage device, according to the inferred hotness values for each extent in the first storage device.

2. The method of claim 1, wherein the metadata associated with input/output operations comprise one or more of: a timestamp, and an input/output command, and a block address, and a data access size, and a data access pattern, and a volume identification.

3. The method of claim 1, wherein the feature data comprise one or more of: a number of blocks within the respective extent that have been accessed more than once during a fixed window of time, and an average number of accesses to such blocks during the fixed window of time, and an average time interval between accesses to such blocks.

4. The method of claim 1, further comprising classifying each extent as hot, warm, or cold by applying thresholds to the inferred hotness values, wherein the promoting and evicting of blocks of data are performed according to the classifying.

5. The method of claim 4, further comprising dynamically adjusting the thresholds using a feedback loop to maximize one or more goal functions.

6. The method of claim 4, further comprising either merging extents having the same classification as hot, warm, or cold according to the thresholds, or dividing an extent into two or more extents, wherein each of the two or more extents has a different classification as hot, warm, or cold according to the thresholds.

7. The method of claim 1, wherein the data cache has a third storage device, the method further comprising:
  organizing the blocks of data in the second storage device into extents, each extent comprising a plurality of the blocks of data having contiguous addresses in the second storage device;
  for each extent in the second storage device, generating feature data as a function of metadata associated with input/output operations on the blocks of data in the respective extent;
  using a data model trained by machine learning to infer a hotness value for each extent in the second storage device as a function of the generated feature data; and
  promoting blocks of data from the second storage device into the third storage device, and evicting blocks of data stored in the third storage device, according to the inferred hotness values for each extent in the second storage device.

8. A non-transitory, computer-readable storage medium, in which is stored computer program code for performing a method of managing blocks of data in a data cache having a first storage device and a second storage device, wherein each block of data has a fixed size that defines the unit of transfer between the first storage device and the second storage device, the method comprising:
  organizing the blocks of data in the first storage device into a plurality of extents, each extent comprising a plurality of the blocks of data having contiguous addresses in the first storage device, wherein at least two extents in the first storage device have different sizes;
  for each extent in the first storage device, generating feature data as a function of metadata associated with input/output operations on the blocks of data in the respective extent;
  using a data model trained by machine learning to infer a hotness value for each extent in the first storage device as a function of the generated feature data; and
  promoting blocks of data from the first storage device into the second storage device, and evicting blocks of data stored in the second storage device, according to the inferred hotness values for each extent in the first storage device.

9. The storage medium of claim 8, wherein the metadata associated with input/output operations comprise one or more of: a timestamp, and an input/output command, and a block address, and a data access size, and a data access pattern, and a volume identification.

10. The storage medium of claim 8, wherein the feature data comprise one or more of: a number of blocks within the respective extent that have been accessed more than once during a fixed window of time, and an average number of accesses to such blocks during the fixed window of time, and an average time interval between accesses to such blocks.

11. The storage medium of claim 8, further comprising program code for classifying each extent as hot, warm, or cold by applying thresholds to the inferred hotness values, wherein the promoting and evicting of blocks of data are performed according to the classifying.

12. The storage medium of claim 11, further comprising program code for dynamically adjusting the thresholds using a feedback loop to maximize one or more goal functions.

13. The storage medium of claim 11, further comprising program code for either merging extents having the same classification as hot, warm, or cold according to the thresholds, or dividing an extent into two or more extents, wherein each of the two or more extents has a different classification as hot, warm, or cold according to the thresholds.

14. The storage medium of claim 8, wherein the data cache has a third storage device, the storage medium further comprising program code for:
  organizing the blocks of data in the second storage device into extents, each extent comprising a plurality of the blocks of data having contiguous addresses in the second storage device;
  for each extent in the second storage device, generating feature data as a function of metadata associated with input/output operations on the blocks of data in the respective extent;
  using a data model trained by machine learning to infer a hotness value for each extent in the second storage device as a function of the generated feature data; and
  promoting blocks of data from the second storage device into the third storage device, and evicting blocks of data stored in the third storage device, according to the inferred hotness values for each extent in the second storage device.

15. A computerized system for managing blocks of data in a data cache having a first storage device and a second storage device, wherein each block of data has a fixed size that defines the unit of transfer between the first storage device and the second storage device, the computerized system comprising:
  a metadata generator, coupled to the first and second storage devices, for generating metadata associated with input/output operations on the blocks of data in the data cache;
  a feature generator, coupled to the metadata generator, for generating feature data, as a function of the generated metadata, for each of a plurality of extents in the first storage device, each extent comprising a plurality of the blocks of data in the first storage device having contiguous addresses, wherein at least two extents in the first storage device have different sizes;
  an inference engine, coupled to the feature generator and comprising a data model, trained by machine learning, for inferring a hotness value for each extent in the first storage device as a function of feature data generated by the feature generator; and
  a cache control interface, coupled to the inference engine and the first and second storage devices, for promoting blocks of data from the first storage device into the second storage device, and evicting blocks of data stored in the second storage device, according to the inferred hotness values for each extent in the first storage device.

16. The computerized system of claim 15, wherein the metadata generator is configured to generate metadata comprising one or more of: a timestamp, and an input/output command, and a block address, and a data access size, and a data access pattern, and a volume identification.

17. The computerized system of claim 15, wherein the feature generator is configured to generate feature data comprising one or more of: a number of blocks within the respective extent that have been accessed more than once during a fixed window of time, and an average number of accesses to such blocks during the fixed window of time, and an average time interval between accesses to such blocks.

18. The computerized system of claim 15, wherein the inference engine is further configured for classifying each extent as hot, warm, or cold by applying thresholds to the inferred hotness values, wherein the promoting and evicting of blocks of data are performed according to the classifying.

* * * * *